Sept. 10, 1968 J. A. AILEO 3,400,407
HELMET WITH RETRACTABLE VISOR
Filed June 27, 1966 3 Sheets-Sheet 1
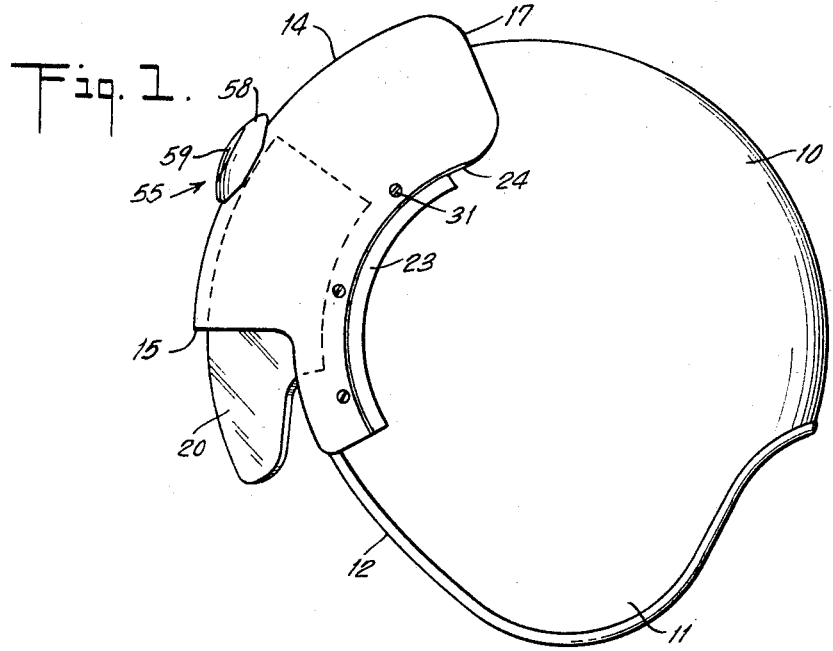
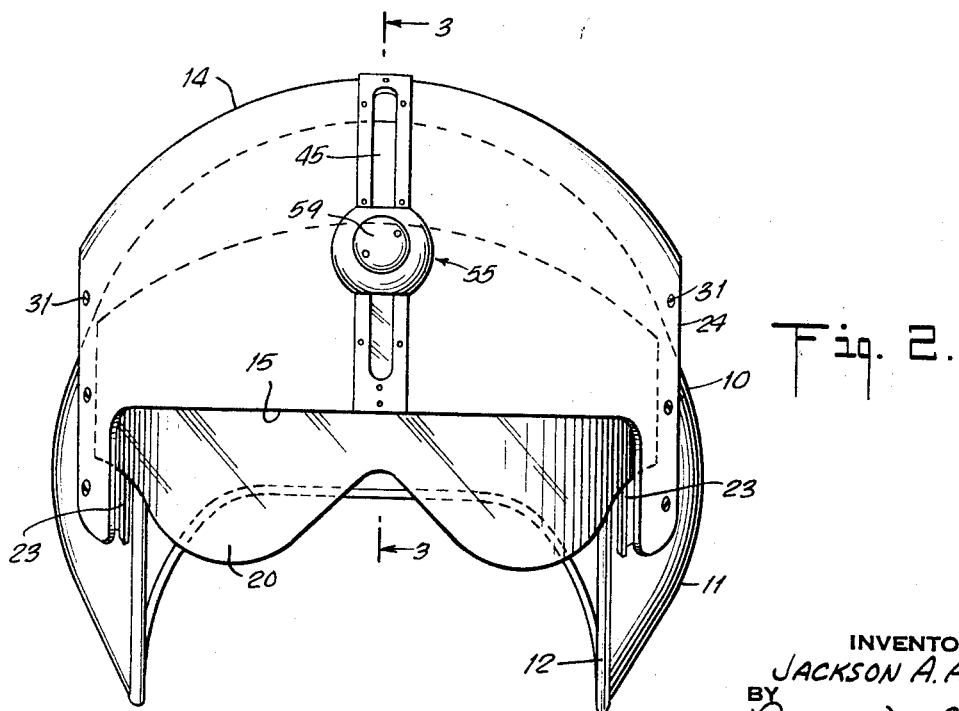
INVENTOR
JACKSON A. AILEO
BY
Lester N. Clark
ATTORNEY

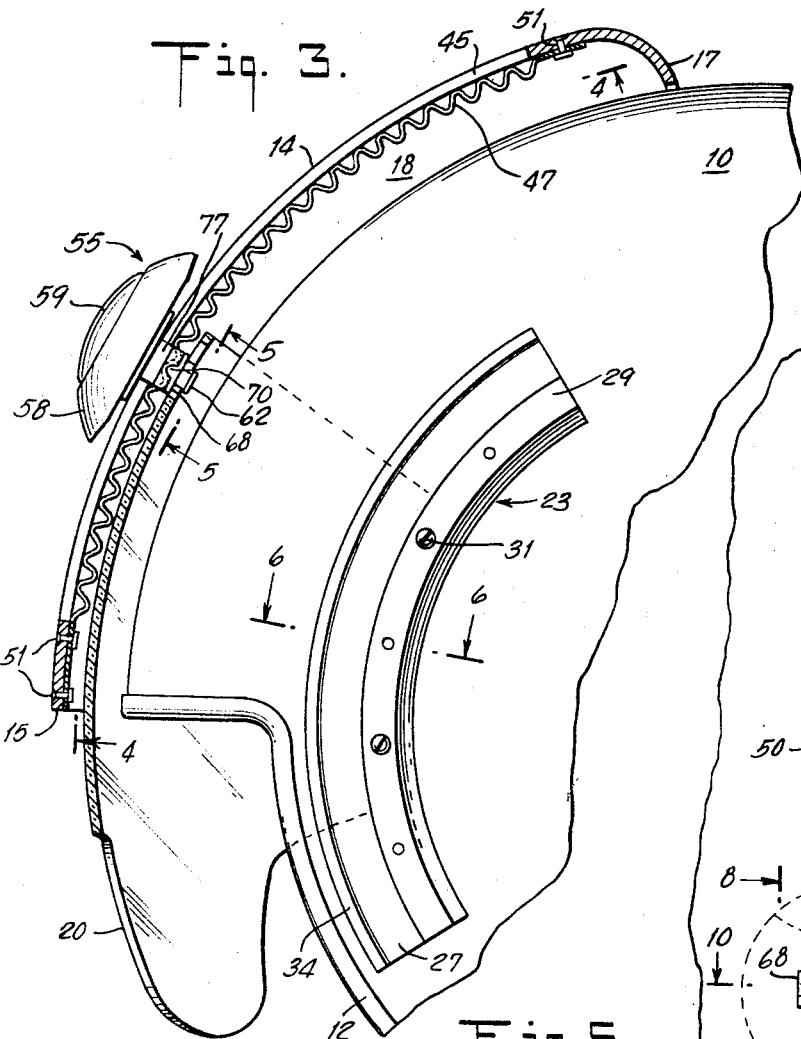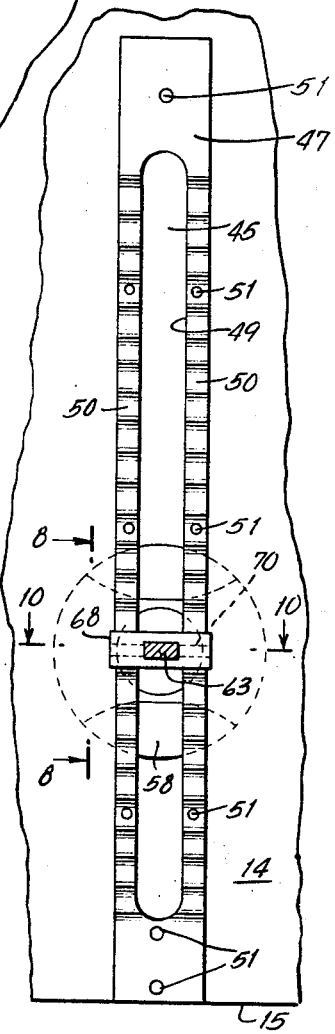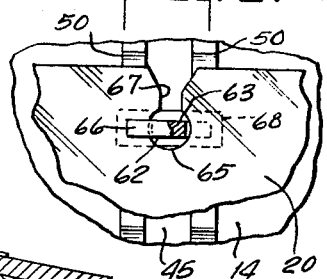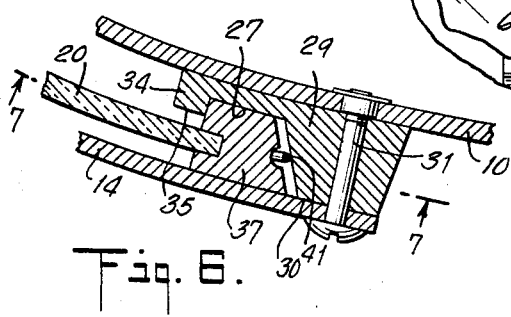

Sept. 10, 1968   J. A. AILEO   3,400,407
HELMET WITH RETRACTABLE VISOR
Filed June 27, 1966   3 Sheets-Sheet 3
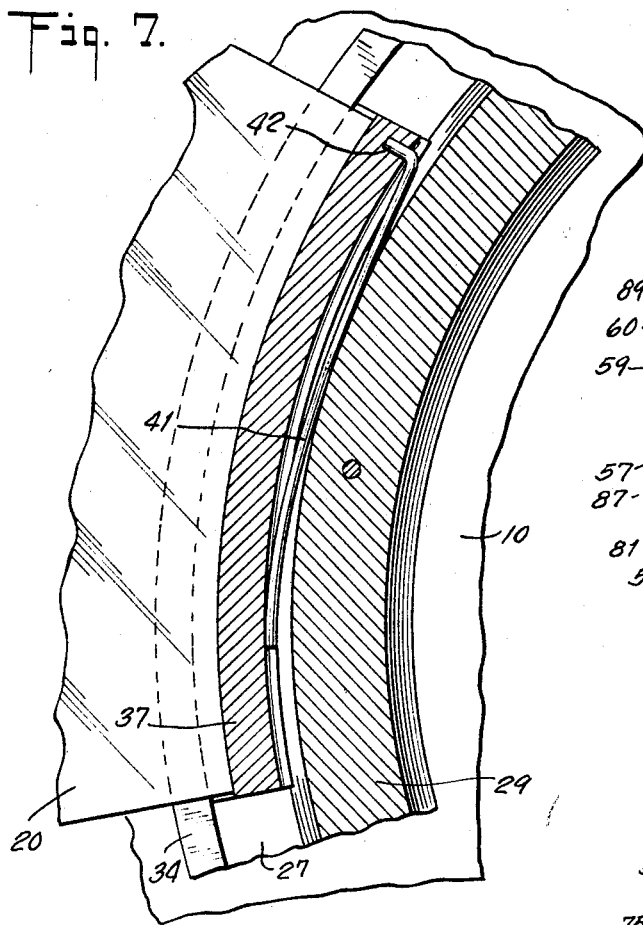
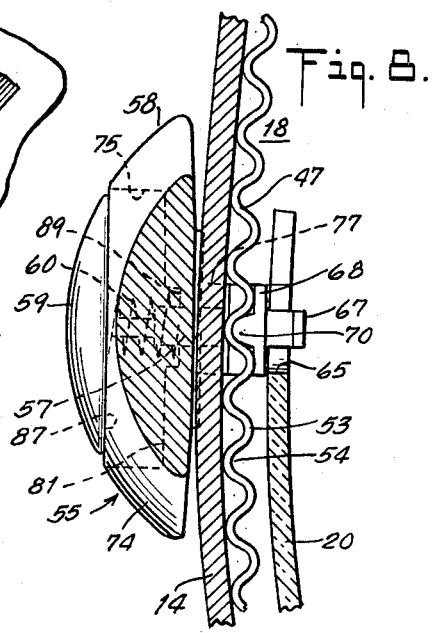
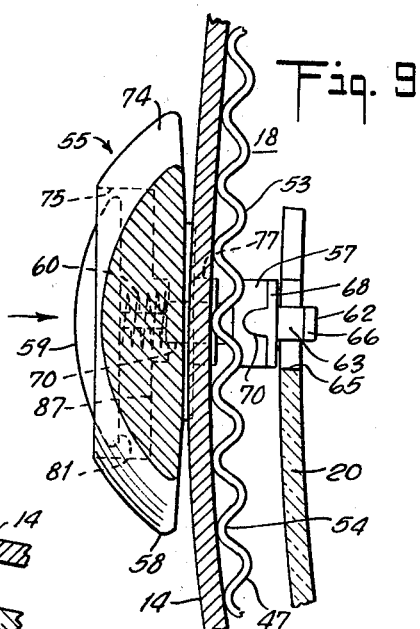
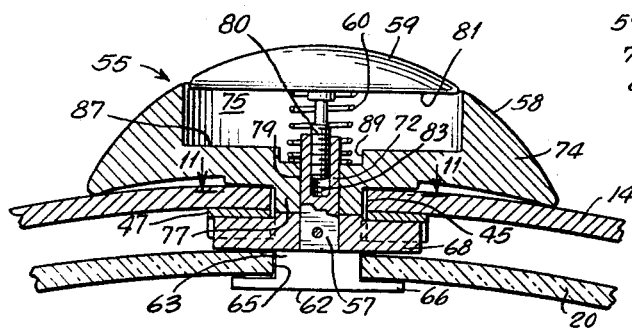
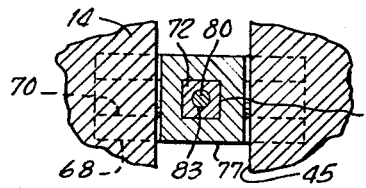
INVENTOR
JACKSON A. AILEO
BY
Lester N. Clark
ATTORNEY

United States Patent Office 3,400,407
Patented Sept. 10, 1968

3,400,407
HELMET WITH RETRACTABLE VISOR
Jackson A. Aileo, Carbondale, Pa., assignor to
Leonard P. Frieder, Great Neck, N.Y.
Filed June 27, 1966, Ser. No. 560,575
9 Claims. (Cl. 2—6)

ABSTRACT OF THE DISCLOSURE

In a protective helmet having a visor movable between a retracted position and an eye-shielding position, a detent arrangement for holding the visor in the retracted position, having interengaging cam and camming surfaces respectively carried by the helmet and the visor and held in engagement by a biasing spring acting on one of them. The biasing force is such as to be overcome by a preselected effective G force acting on the helmet (i.e. occasioned by a blow or shock), permitting disengagement of the camming surface from the cam surface by sliding movement of the camming surface relative to the cam surface, thereby releasing the visor from the retracted position so that it falls into eye-shielding position. Manually adjustable means are provided for varying the biasing force of the spring to select the value of G force required to overcome the biasing force and release the visor.

---

This invention relates to protective helmets having retractable visors, and more particularly to such helmets incorporating novel and improved means for retaining the visor in a retracted position.

It is frequently desirable to provide a protective helmet with a transparent visor for shielding the wearer's eyes from bright light or from flying objects or particles. To facilitate putting on and removing the helmet, and also to enable use of the helmet without interposition of the visor in the wearer's line of sight, the visor may be arranged for movement between an eye-shielding position and a retracted position above the wearer's eyes. Such movement of the visor, and retention thereof in a desired position, may be effected by manually operable means, for example as shown in U.S. Patent No. 3,066,305, granted Dec. 4, 1962, to Jackson A. Aileo.

When a helmet of this type is worn under conditions normally presenting no hazard to the eyes, the visor is often maintained in retracted position, in accordance with the wearer's preference or for convenience or assured accuracy and clarity of vision. However, explosions or other unforeseen occurrences, typically accompanied by a shock or blow to the helmet, may suddenly necessitate immediate shielding of the eyes. In such circumstances, manual adjustment of the visor by the wearer may not provide the requisite protection with sufficient rapidity, and in any event the wearer's hands may be occupied in dealing with the emergency, or incapacitated.

It is accordingly an object of the present invention to provide a new and improved protective helmet structure having a visor which is normally retainable in a retracted position, but which releases in effect automatically and drops to eye-shielding position when the helmet receives a shock or blow.

Another object is to provide such a helmet including visor-retaining means adjustable to afford automatic release of the visor upon a shock or blow of predetermined force, and to preselect the value of the force required to effect such release.

A further object is to provide such a helmet including adjustable visor-retaining and displacing means which are operable by simple manipulation with the fingers of one hand.

To these and other ends, the invention broadly contemplates, in a helmet structure including a rigid helmet shell and a visor supported on the shell for movement between retracted and eye-shielding positions, the combination of first and second members respectively carried by the shell and visor for retaining the visor in a retracted position, these members being arranged to interengage upon movement of the visor to a retracted position for holding the visor in the retracted position, and to release the visor therefrom in response to a preselected effective G force acting on the helmet; and manually adjustable means, connected to and acting on one of the aforementioned members, for varying the value of the preselected G force at which the visor will be released.

In accordance with specific features of the invention, the first and second members referred to above present interengaging cam surfaces extending in the direction of visor movement between retracted and eye-shielding positions so that motion of the visor from retracted position can be effected with concomitant camming action between these members. Means are included for biasing the first and second members into engagement with each other to oppose such camming movement and thereby normally to retain the visor in the retracted position. The biasing force, however, is such as to be overcome by a preselected effective G force acting on the helmet, whereupon the visor is released and drops to eye-shielding position with camming action between the two members. The manually adjustable means for selecting the value of G force needed to effect such release constitutes means acting on the biasing means and adjustable to vary the magnitude of the biasing force that must be overcome to release the visor.

The foregoing combination may be embodied in a helmet structure wherein the visor, when in retracted position, is received within a pocket in the forward portion of the helmet. This pocket may be provided by a visor cover secured to the helmet in spaced relation thereto and having a slot extending in the direction of visor movement to and from the retracted position. Detent means such as a metal strip providing an inwardly-facing cam surface is mounted on the inner surface of the cover adjacent to and extending along the slot, and a detent-engaging member presenting an outwardly-facing camming surface is carried by the visor for engagement with the cam surface of the detent strip. The latter member has a shaft portion which projects outwardly through the slot, transversely of the cover surface, and through a slider element supported on the exterior of the cover for sliding movement along the slot. Outwardly of the slider there is disposed a button carried by the end of the aforementioned shaft in threaded engagement therewith so as to be axially displaceable toward and away from the shaft (and hence toward and away from the slider) by screwing and unscrewing action relative to the shaft; the button and the detent-engaging member including the shaft are capable of inward and outward sliding movement, along the shaft axis, relative to the slider.

A helical spring under compression is interposed between the button and slider, bearing against the facing surfaces of these two elements to urge the button continuously outward relative to the slider and thereby to hold the camming surface of the detent-engaging member in engagement with the cam surface of the detent strip for retaining the visor in retracted position. Manual pressure on the button overcoming the biasing force of the spring, forces the camming surface of the detent-engaging member inwardly away from the cam surface of the detent strip to permit free upward and downward movement of the visor when desired. The biasing force of the spring is such that it is also overcome by an effective G force of preselected magnitude acting on the helmet, as in the case of a shock or blow to the helmet, whereupon the visor is released from retracted position to drop to eye-shielding position by camming action of the detent-engaging member relative to the detent strip. The G force required for such release is selected by turning the threaded button relative to the shaft of the detent-engaging member to vary the spacing between the button and slider and thereby to vary the degree of compression of the spring, which determines the biasing force that must be overcome to release the visor.

Further features and advantages of the invention will be apparent from the detailed description hereinbelow set forth, together with the accompanying drawings, wherein:

FIG. 1 is a side elevational view of a helmet embodying the invention in a particular form;

FIG. 2 is a front elevational view of the helmet of FIG. 1;

FIG. 3 is a partial vertical sectional view taken along the line 3—3 of FIG. 2;

FIG. 4 is a fragmentary view taken along the line 4—4 of FIG. 2 and showing the detent strip of the helmet;

FIG. 5 is a fragmentary view taken along the line 5—5 of FIG. 3 showing the connection of the detent-engaging member to the visor;

FIG. 6 is a fragmentary sectional view taken along the line 6—6 of FIG. 3 showing a track element for supporting the visor;

FIG. 7 is another view of the track element, taken as along the line 7—7 of FIG. 6;

FIG. 8 is a detail view, partly in section, showing the detent-engaging member and the slider in visor-retaining position, taken along the line 8—8 of FIG. 4;

FIG. 9 is a view similar to FIG. 8 but showing the detent-engaging member in position releasing the visor;

FIG. 10 is a detail sectional view of the detent-engaging member and slider taken along the line 10—10 of FIG. 4; and FIG. 11 is a sectional view along the line 11—11 of FIG. 10.

Referring to the drawings, the invention is shown as embodied in a helmet structure including a helmet shell 10 of generally hemispherical shape dimensioned to fit over the head of a wearer and having depending ear-covering portions 11. The edge of the shell is covered by a strip 12 of rubber, plastic or the like, as shown in FIG. 1–3, to protect the wearer from contact therewith. As in the case of rigid protective helmets generally, a suitable internal rigging may be mounted within the shell 10 to suspend the shell in spaced relation to the wearer's head; this rigging, which may be entirely conventional in form, constitutes no part of the present invention and is not shown in the drawings.

Over the forward portion of the helmet there is mounted a rigid visor cover 14, conforming generally in configuration to the curved surface of the subjacent forward position of the helmet but spaced in relation thereto. The lower edge 15 of the cover extends across the front of the helmet above the wearer's eyes and is spaced forwardly of the shell 10; the upper edge 17 of the cover is reverted toward the shell. A visor-receiving space or pocket 18, opening downwardly along its lower extent behind cover edge 15, is thereby defined between the cover and the shell.

The helmet has a transparent visor 20 shaped and dimensioned to cover the upper portion of the wearer's face when disposed in eye-shielding position in front of the wearer's eyes. A pair of track elements 23, respectively disposed on the forward portion of the shell 10 at opposite sides thereof, support the visor 20 for upward and downward movement between a lower, eye-shielding position and an upper, retracted position in which the visor is wholly received within the pocket 18. These track elements also constitute the mounting for the cover 14, which is secured thereto along its opposite side edges 24.

As shown in FIGS. 3, 6 and 7, each of the track elements 23 provides an outwardly-opening arcuate groove 27, the two track elements being so disposed (FIG. 2) that the arcs of these grooves lie in parallel vertical planes. In each element 23, the rearward side of the groove 27 is defined by a side surface of a body portion 29 of the element. This body portion has an outer surface 30 of substantial extent for engaging and supporting the underside of the cover 14 adjacent the side edge 24 thereof. The body portion 29 and the cover at each such side edge are secured to each other and to the shell 10 by suitable means shown as screws 31. The forward side of the groove 27 in each track element is defined by a curved wall 34 of the element extending outwardly from the shell 10 but having an outer surface 35 spaced inwardly from the cover 14 by a distance sufficient to accommodate free passage of the visor 20 between the surface 35 and the cover.

Along each side edge of the visor 20 is mounted a bead 37 shaped and dimensioned to fit within the groove 27, between body portion 29 and wall 34, of the adjacent track element 23, for sliding movement of the bead along the groove concomitantly with movement of the visor between the eye-shielding and retracted positions. The cover 14, mounted on the track elements, cooperates therewith to retain the beads 37 of the visor 20 within the grooves 27 so that the track elements support the visor for sliding upward and downward movement while guiding the visor to maintain it in proper relation to the shell 10 and cover 14 throughout such movement.

In the present helmet structure, each bead 37 may carry an elongated straight wire spring 41 (FIGS. 6 and 7) having a bent end 42 embedded in the bead and a major extent lying along the groove 27, under deflection between the bead and the facing side surface of the body portion 29. The spring, being in frictional tangential engagement with the latter surface, provides resistance against sliding movement of the bead along the groove and hence tends to maintain the visor at any position at which it may be set.

Referring further to FIGS. 1, 3 and 4, the cover 14 has a central slot 45 extending along an arc in a vertical plane from a locality immediately above the lower cover edge 15 to a locality immediately below the upper edge 17. A detent member, comprising an elongated strip 47 of metal or the like with a central slot 49 of the same shape and size as the cover slot 45, is mounted on the inner surface of the cover 14 along the slot 45 in such position that the slots 45 and 49 are in register. The portions of the strip on each side of slot 49 in effect constitute two parallel legs 50 respectively extending along the two opposed side edges of slot 45 on the inner surface of the cover. Strip 47 is secured to the cover by a plurality of rivets 51 disposed along both legs 50 and at the extremities of the strip above and below the slot 45; these rivets hold the strip against the inner cover surface so that it conforms to the arcuate extent of the cover adjacent the latter slot.

Along both leg portions 50, and for the full extent of slot 45 in the embodiment shown, strip 47 is crimped into transverse corrugations of generally sinusoidal contour forming a continuous succession of teeth 53 projecting into the pocket 18, equally spaced and separated by depressions 54. The teeth and depressions together constitute detent means providing inwardly-facing paired continuous cam surfaces extending, in the direction of movement of the visor 20, along the inner surface of the cover 14 adjacent the two side edges of slot 45.

A detent-engaging means generally designated 55, and shown in detail in FIGS. 5 and 8–11, is carried by the visor 20 and adapted to cooperate with the described detent means to hold the visor in any desired position. This means 55, which in the illustrated combination with the foregoing elements embodies important particular features of the present invention, broadly comprises a detent-engaging member 57, a slider 58, a button 59, and a helical biasing spring 60, all as hereinafter further described, it being understood that in the following description the terms "inward" and "outward" refer to directions toward and away from the adjacent surface of shell 10, respectively.

The detent-engaging member 57 at its inward end includes a stud 62 for connecting the member 57 to the visor 20. This stud comprises a shank portion 63 of rectangular cross section extending through an opening 65 in the visor 20 adjacent the midpoint of the upper edge of the visor, and oppositely directed flange portions 66 extending laterally from the shank 63, on the inward side of the visor, beyond the edges of opening 65 to prevent disengagement of the stud from the visor.

As shown in FIG. 5, the visor opening 65 is circular and has a diameter somewhat greater than the long cross-sectional dimension of the stud shank 63. A notch 67, narrower than the latter dimension but wider than the short cross-sectional dimension of the shank, extends upwardly through the visor from the opening 65 to the upper visor edge. Thus when the shank 63 is disposed in the opening 65 with its long cross-sectional dimension transverse to the notch 67 (the position illustrated in FIG. 5), it is positively retained within the opening; but when turned 90° from that position to align its long dimension with the notch, it can readily be slipped upwardly through the notch to disengage the stud 62 from the visor.

Outwardly of the visor 20 there is disposed a further portion of the member 57 comprising a pair of flanges 68 extending laterally of the slot 45, between the visor and the cover 14, in opposite directions so that the two flanges 68 respectively underlie the two legs 50 of the detent strip 47. Each flange 68 bears on its outer surface (facing the adjacent leg 50) a rib 70 of generally hemispherical cross section which provides a camming surface extending in the direction of visor movement, adapted to engage the cam surface of the adjacent leg 50 in camming relation thereto, and to be received in any of the depressions 54. The flanges 68, including the rib portions 70, may be formed as a solid, unitary rigid body of metal or the like.

Member 57 also includes a shaft 72, square in cross section, extending outwardly from the flanges 68 through the slot 45 along an axis transverse to the cover 14. The shaft 72, flanges 68 and stud 62 are fixedly secured together to form in effect a single rigid member carried by the visor 20. As the visor moves between its retracted and eye-shielding positions, the shaft 72 moves along the slot 45 between localities respectively adjacent the upper and lower ends of the slot.

The slider 58 comprises a rigid head 74 supported on the external surface of the cover 14 at the outer end of the shaft 72 for sliding movement along the slot 45 with the shaft. This head 74 extends laterally beyond both side edges of the slot 45, overlapping the portions of the external cover surface adjacent the slot edges, and has an enlarged and centrally disposed outwardly-opening cylindrical recess 75 for receiving the button 59. Formed integrally with the slider head 74, and projecting inwardly therefrom into the slot 45, is a square hub portion 77 dimensioned to slide freely within the slot but to interfere with the slot edges to prevent rotation of the slider relative to the cover 14, as will be apparent from FIG. 11. The shaft 72 of member 57 extends outwardly into the recess 75 through a square centrally disposed opening 79 in the hub 77; the clearance between the shaft 72 and the edges of the opening 79 is such as to permit sliding movement of the shaft along its axis inwardly and outwardly relative to the slider 58, but to prevent rotation of the shaft relative to the slider. The shaft and slider move together along slot 45 by virtue of the lateral engagement of the shaft with the edges of the opening 79.

The button 59 is a generally disk-shaped element bearing an extremely threaded stem 80 which projects inwardly from the center of the flat inner surface 81 of the button in axially perpendicular relation to the latter surface. An internally threaded axial bore 83 is provided at the outer end of the shaft 72 within the slider recess 75, for receiving the stem 80 to afford threaded engagement of the button 59 with the member 57. As thus mounted, with the stem 80 threaded in bore 83, the button is disposed in the slider recess 75 with its inner surface 81 spaced outwardly from the facing surface 87 of the slider recess. Since it is secured to the member 57, the button 59 moves inwardly and outwardly in the recess 75 relative to the slider concomitantly with inward and outward movement of the member 57.

The helical spring 60 is interposed under compression between the facing surfaces 81 and 87 of the button and slider, respectively, in concentric relation to the shaft 72 and stem 80 within the recess 75. As indicated at 89 in FIGS. 8–10, a central portion of the surface 87 may be slightly recessed to constitute a seat for one end of the spring 60. The other end of spring 60 bears against the surface 81 of the button 59. Since the spring is under compression between the button and the slider (which bears inwardly against the surface of the cover 14), it exerts a continuous outward force on the surface 81 of the button, biasing the button outwardly relative to the cover. The force of this bias is determined by the extent of compression of the spring, which (for any given spring) is governed by the spacing between the button 59 and the slider surface 87.

The outward biasing force exerted on the button 59 by the spring 60 is communicated to the flanges 68, with which the button is connected by the shaft 72, so that the flanges are similarly urged outwardly into engagement with the legs 50 of the detent strip 47. When the ribs 70 of the flanges 68 are disposed within depression 54 of the detent strip as shown in FIG. 8, the outward biasing force of spring 60 holds the ribs in the depressions, resisting camming movement of the ribs out of the depressions in either (upward or downward) direction. This biasing force is such as to be normally sufficient to prevent camming movement of the ribs out of the depressions, so that the visor is held fixed in any position at which it may be set by the described engagement of the ribs 70 with detent strip depressions 54.

In the operation of the illustrated structure, movement of the visor to or from fully retracted position, or any intermediate position such as that shown in FIGS. 1–3, is effected by manually depressing the button 59 inwardly against the force of spring 60, as indicated by the arrow in FIG. 9. The inward movement of the button displaces the flanges 68 inwardly, away from engagement with the teeth 53 and depressions 54 of the detent strip legs 50, to the position shown in FIG. 9, while causing a corresponding inward deflection of the upper portion of the visor (which is sufficiently resilient to accommodate such inward deflection); with the detent-engaging means thus freed, the visor may then be moved to any other desired position by moving the slider 58 upwardly or downwardly along the slot 45 while maintaining the button 59 depressed to hold the flanges 68 clear of the detent strip 47. When the desired visor position is reached, the button 59 is released; thereupon the spring 60 urges flanges 68 back into engagement with the detent strip 47, causing the ribs 70 to be cammed into the nearest adjacent depressions 54 of the detent strip and held therein to retain the visor in such position.

It will be understood that, when the visor is disposed at any position above the lowermost position in its range of motion, any net downward force exerted on the visor tends to cause downward camming movement of the flanges 68 relative to the detent strip 47. As stated, the biasing spring 60 is effective normally to prevent such camming action, and thereby to retain the visor fixed in position. However, the biasing force of the spring is such that when the helmet is subjected to a shock or blow of predetermined effective G force, the downward force thereupon imparted to the visor is sufficient to overcome the bias of the spring; thus, in response to such a force, the ribs 70 of flanges 68 move by camming action out of the depressions 54 in which they are seated, releasing the visor for downward movement (with concomitant downward camming movement of the flanges 68 along the detent strip 47) until the visor reaches its lowest, eye-shielding position at which further downward movement of the visor is arrested by engagement of the slider hub 77 with the lower edge of slot 45.

In this way, when the helmet is subjected to a shock or blow of sufficient force the visor is in effect automatically released and caused to drop immediately to eye-shielding position as desired for protection of the wearer's eyes. As will be appreciated, the described visor-releasing action is achieved by the special cooperation of the biasing means and the particular form of detent engagement provided in the present helmet. That is to say, the provision of cam surfaces respectively carried by the helmet and the visor, and biased into engagement, affords a detent arrangement which retains the visor in a way that can be overcome by a sufficient net downward shock force acting on the visor.

As a further particular advantage of the invention, the biasing force holding the flanges 68 in engagement with the detent strip 47 is adjustable to vary the minimum G force required to effect the described automatic release of the visor. This biasing force, as mentioned above, is dependent on the degree of compression of spring 60, and therefore on the spacing of the surfaces of the button 59 and slider 58 between which the spring is interposed. The biasing force can accordingly be varied by varying the distance between these surfaces. Since the stem 80 of button 59 is threaded in the outer end of the shaft 72 of member 57, such variation in spacing is readily accomplished by turning the button relative to the shaft to vary the extent of threaded engagement of the button stem and the shaft.

Further in this regard, it will be understood that spring 60 continuously urges button 59 outward and slider 58 inward to the respective limits of outward and inward movement of these elements. Inward movement of the slider 58 is limited by abutment of the slider with cover 14. Outward movement of the button 59 is limited by engagement of the flanges 68, to which it is connected through shaft 72, with the detent strip 47. The outward position of the button 59 relative to the slider is therefore determined by the spacing between the button and the flanges 68; the threaded engagement of the button on shaft 72 (to which the flanges 68 are fixedly secured), by permitting inward and outward axial displacement of the button relative to the shaft and flanges 68 while holding the button fixed in relation to the latter parts at any position to which the button is turned, enables variation in the effective spacing between the button and slider for adjustment of the biasing force of spring 60.

Specifically, assuming that the stem 80 and the bore 83 of shaft 72 have conventional right-handed threads, turning of the button to the right (in a direction to screw the button further on the shaft) advances the button axially toward the shaft 72, and concomitantly reduces the distance between the facing surfaces of the button and the slider 58; the compression of the spring 60 is thereby increased, enhancing the biasing force that must be overcome for automatic release of the visor 20. Turning of the button to the left (in the direction for unscrewing the button) displaces the button away from the shaft 72, increasing the spacing between the button and slider to reduce the compression of the spring and thus to decrease the biasing force. In a typical example, in a helmet having the illustrated structure, the biasing force of the spring 60 may be varied in this manner between a value at which an effective force of 5 G on the helmet will release the visor and a value requiring an effective force of 20 G to release the visor.

Adjustment of the biasing force, for selecting the G force at which automatic visor release will occur, is facilitated by the configurations of the slider hub 77 and of shaft 72 which, as already stated, prevent rotation of the shaft and slider relative to the helmet and to each other. That is to say, the button 59 can readily be screwed inwardly or outwardly to effect such adjustment, simply by turning with the fingers of one hand, and there is no need to hold the slider 58 since neither it nor the shaft 72 can rotate.

The detent-engaging means 55 in the form shown is further adapted for facile assembly and disassembly. For instance, should it be desired to remove the visor completely from the helmet, the button 59 is first unscrewed completely to disengage it from the shaft 72. The spring 60 and slider 58 then slide freely off the outer end of shaft 72. Member 57 may then be turned 90° in place, by turning shaft 72 with the fingers, to align the long dimension of the stud shank 63 with the visor notch 67, and, after member 57 is slid upwardly (along the slot 45) to disengage the stud 62 from the visor in the manner already described, the entire member 57 may simply be lifted out of the slot, the width of the flanges 66 and 68 being sufficiently small to enable them to pass through the slot when the member 57 is thus turned. With the detent-engaging means removed, the visor 20 may be pulled downward manually along the tracks 23 until it is free of the tracks and the visor cover 14. Reassembly may be effected by performing the foregoing steps in reverse sequence.

It is to be understood that the invention is not limited to the features and embodiments hereinabove specifically set forth, but may be carried out in other ways without departure from its spirit.

I claim:

1. In a protective helmet having a shell dimensioned to receive the head of a wearer, a visor, and means carried by said shell for supporting said visor for movement between a retracted position adjacent the forward portion of the shell above the wearer's eyes and a position shielding the wearer's eyes, the combination therewith of:

(a) means for retaining said visor in said retracted position, said means including a first member carried by said shell and having a cam surface and a second member carried by said visor and having a camming surface for engaging said cam surface, each of said cam surface and said camming surface having a portion sloping in the direction of movement of said visor, said first and second members being mutually disposed and adapted for visor-retaining interengagement of said sloping portions of said cam surface and said camming surface upon movement of said visor to said retracted position, and for disengagement by sliding movement of said camming surface sloping portion relative to said cam surface sloping portion, to release said visor from said retracted position, upon application of a preselected effective G force to said helmet, to afford movement of said visor to said position shielding the wearer's eyes in response to said G force; and (b) adjustable means, connected to one of said members, for varying the value of said preselected effective G force at which said first and second members disengage to release said visor.

2. A helmet as defined in claim 1, wherein said means for retaining said visor includes biasing means acting on one of said members for biasing said one member into engagement with the other of said members to maintain the interengagement of said sloping portions of said cam surface and said camming surface, the force exerted by said biasing means being such as to be overcome upon application to said helmet of said preselected effective G force; and wherein said adjustable means comprises means acting on said biasing means for varying the biasing force exerted thereby.

3. In a protective helmet, in combination,
(a) a shell dimensioned to receive the head of a wearer;
(b) a visor for shielding the wearer's eyes;
(c) track means secured to said shell for supporting said visor for guided sliding movement between a retracted position adjacent the forward portion of said shell above the wearer's eyes and a shielding position forwardly of the wearer's eyes;
(d) a cover secured to said shell and extending over said forward portion of said shell in spaced relation thereto to define a pocket, between said cover and said shell, for receiving said visor in said retracted position, said cover having a slot extending in the direction of movement of said visor;
(e) detent means providing a cam surface disposed at the inner surface of said cover adjacent said slot and extending in the direction of movement of said visor;
(f) a slider supported on the outer surface of said cover for movement along said slot;
(g) a detent-engaging member secured to said visor and extending outwardly therefrom through said slot and said slider, said detent-engaging member being movable inwardly and outwardly relatively to said silder and having a portion, extending laterally between said cover and said visor, providing a camming surface for engaging said cam surface of said detent means, each of said cam surface and said camming surface having a portion sloping in the direction of movement of said visor, said detent means and said detent-engaging means being mutually disposed and adapted for interengagement of said sloping portions of said cam surface and said camming surface when said visor is at said retracted position for retaining said visor at said retracted position;
(h) means carried by said slider and acting on said detent-engaging member for biasing said member outwardly relative to said slider thereby to hold said sloping portion of said camming surface of said member in engagement with said sloping portion of said cam surface of said detent means, the force exerted by said biasing means being such as to be overcome upon application of a preselected effective G force to said helmet, for disengagement of said detent-engaging means from said detent means by sliding movement of said camming surface sloping portion relative to said cam surface sloping portion, to release said visor in response to said G force for movement thereof to said shielding position; and
(i) adjustable means for varying the biasing force exerted by said biasing means to select the value of G force required to overcome the biasing force.

4. A helmet as defined in claim 3, wherein said adjustable means includes a button carried by said detent-engaging member in outwardly spaced relation to a surface of said slider, said button being displaceable inwardly and outwardly relative to said detent-engaging member to vary the spacing between said button and said last-mentioned slider surface; and wherein said biasing means acts on said button and said slider and exerts a biasing force therebetween determined by the spacing between said button and said last-mentioned slider surface.

5. A helmet as defined in claim 4, wherein said biasing means comprises spring means interposed under compression between said button and said last-mentioned slider surface.

6. A helmet as defined in claim 5, wherein said button is in threaded engagement with said detent-engaging member and is displaceable toward and away from said member by turning to vary the extent of threaded engagement of said button with said member.

7. A helmet as defined in claim 6, wherein said slider includes a hub portion extending inwardly into said slot and having an aperture, and wherein said detent-engaging member includes a shaft portion projecting outwardly through said aperture, said shaft portion and aperture being mutually shaped to prevent rotation of said detent-engaging member relative to said slider, and said hub portion being shaped to interfere with the side edges of said slot to prevent rotation of said silder relative to said slot.

8. A helmet as defined in claim 3, wherein said detent means provides a continuous cam surface extending along substantially the full length of said slot and comprising a succession of cam teeth having surfaces sloping in the direction of movement of said visor and spaced apart by cam-shaped depressions, said camming surface of said detent-engaging member being adapted to be received in any of said depressions to retain said visor at any of a plurality of positions each corresponding to one of said depressions.

9. A helmet as defined in claim 3, including spring means carried by said visor in tangential engagement with said track means for frictionally resisting sliding movement of said visor relative to said track means.

References Cited

UNITED STATES PATENTS

| | | | |
|---|---|---|---|
| 2,798,221 | 7/1957 | Bailey et al. | 2—6 |
| 3,066,305 | 12/1962 | Aileo | 2—6 |

JORDAN FRANKLIN, *Primary Examiner.*

JAMES R. BOLER, *Assistant Examiner.*